June 11, 1963 J. C. REED 3,093,823
RADAR RELAY SYSTEM
Filed March 17, 1961 3 Sheets-Sheet 1

INVENTOR.
JOHN C. REED
BY Wade Koontz
George Fine
ATTORNEYS

June 11, 1963   J. C. REED   3,093,823
RADAR RELAY SYSTEM
Filed March 17, 1961   3 Sheets-Sheet 3

INVENTOR.
JOHN C. REED
BY
ATTORNEYS

3,093,823
RADAR RELAY SYSTEM
John C. Reed, Santa Barbara, Calif., assignor to the United States of America as represented by the Secretary of the Air Force
Filed Mar. 17, 1961, Ser. No. 96,615
4 Claims. (Cl. 343—11)
(Granted under Title 35, U.S. Code (1952), sec. 266)

The invention described herein may be manufactured and used by or for the United States Government for governmental purposes without payment to me of any royalty thereon.

This invention relates to the retransmission of signals representative of radar information, and more particularly, a retransmission of radar signals in which the bandwidth of the original signals is reduced substantially while preserving the requisite information contained therein.

The normal plan position indicator which is associated with a radar system is utilized to display target signals resulting from the radar operation. It is desirable, in many applications, to relay the target signals displayed on the face of the aforementioned plan position indicator to a distant plan position indicator for presentation upon the face thereof. This relay or retransmission of target signals in the prior art, required a wide band retransmission system in order to retain the ability to indicate targets at the same azimuth and range. The present invention provides a narrow band plan position indicating system by limiting the number of targets per azimuth to be indicated and thereby converts the limited target information into a narrow band system. By limiting the wide band plan position indicating information in this manner, there exists the greatest probability of seeing all aircraft targets. It is to be noted that techniques such as moving target indicator, or clutter cancellation indicator, may be employed to remove fixed ground targets.

An object of the present invention is to provide a system for relaying radar target signals for presentation upon the face of a plan position indicator wherein the bandwidth required for the radar target signals is drastically reduced while retaining the requisite information contained therein.

Another object of the present invention is to provide a system for converting wide band radar range information into a narrow band.

Yet another object of the present invention is to provide a novel system of radar range increment selection.

Still another object of the present invention relates to narrow band retransmission of radar range and azimuth information.

For a better understanding of the present invention, together with other and further objects thereof, reference is made to the following specification and claims and to the accompanying drawings in which:

FIGURE 4 is a diagram of the multiple channel receiver portion of my invention which operates in conjunction with the transmitter of FIGURE 3.

Figure 1:
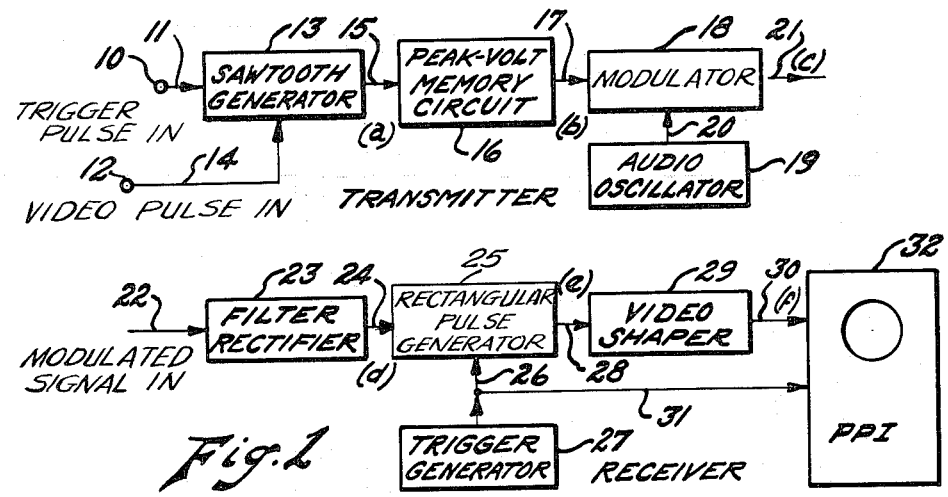
FIGURE 1 is a diagram showing a single range channel of my invention including the transmitter and receiver portion thereof.
Figure 2:
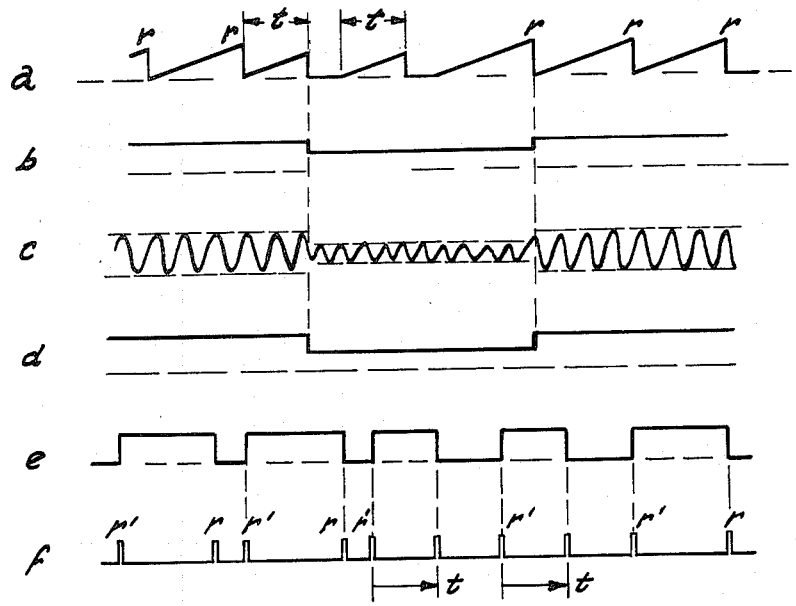
FIGURE 2 shows the pertinent waveforms illustrating the operation of the one channel system of FIGURE 1.

Now referring in detail to FIGURE 1, there is shown terminal 10 which receives a trigger pulse from an associated radar system. The aforesaid trigger pulse is representative of the pulse repetition frequency of the radar system. The trigger pulse is then received by sawtooth generator 13 by way of line 11 and thereupon generator 13 begins to generate a sawtooth waveform whose length will correspond to the period that exists between trigger pulses. However, terminal 12 receives radar video target signals representative of target range from the abovementioned radar system. These radar video target signals are received by sawtooth generator 13 by way of line 14. Sawtooth generator 13 is switched off whenever it receives a radar video target signal. Thus, it is apparent that at the output of sawtooth generator 13 with a radar target signal present, there will appear a sawtooth waveform whose length is proportional to the target range. Sawtooth generator 13 is conventional, but is shut off by utilizing the target signal as a bias. The sawtooth waveforms appearing on line 15 are received by peak-voltmeter memory circuit 16. The sawtooth waveforms on line 15 are shown in FIGURE 2(a). It is to be noted that "r" represents the original repetition rate and "t" the target period.

The generated sawtooth waveforms of varying lengths and amplitude are received by peak-voltmeter memory circuit 16 by way of line 15. Memory circuit 16 is merely a voltmeter that measures the peak voltage amplitude of each received sawtooth waveform and retains that value until a sawtooth waveform of another peak voltage amplitude is received. The peak-voltmeter memory circuit 16 is of the conventional type. The output of memory circuit 16 appears on line 17 and the pertinent waveform is illustrated in FIGURE 2(b). It is apparent that the output is a direct current voltage whose amplitude varies only when the amplitude of the sawtooth waveform being measured varies. Thus, when a radar target is present, the output voltage from memory circuit 16 is proportional to the target range.

Audio oscillator 19 generates a sinusoidal audio signal of fixed frequency. The generated audio signal is received by modulator 18 by way of line 20. Simultaneously, modulator 18 receives a varying direct current voltage by way of line 17. The output signal from modulator 18 appears on line 21 and is illustrated in FIGURE 2(c).

The modulated signal appearing on line 21 may be transmitted by way of a telephone line to a remote receiver, such as shown in FIGURE 1. Line 22 receives the transmitted modulated signal which is applied to filter-rectifier 23. The output of filter-rectifier 23 appears on line 24 and the significant waveform is illustrated in FIGURE 2(d).

The signal appearing on line 24 is a direct current voltage type which is applied to rectangular pulse generator 25. Rectangular pulse generator 25 also receives a trigger pulse from trigger generator 27 by way of line 26. Rectangular pulse generator 25 may be a phantastron circuit. The phantastron circuit has a unique advantage over multivibrators in that the output pulse width varies directly with one of the D.C. applied voltages. The trigger pulse applied to rectangular pulse generator 25 has a repetition frequency which, by reason of the values of the various components in the trigger generator 27, is substantially identical to the pulse repetition rate of the radar system associated with the aforementioned transmitter to establish a time reference in the receiver that will correspond to, but need not be in identical time phase synchronization with, that of the transmitter. The trigger pulse is utilized to actuate rectangular pulse generator 25 and the D.C. voltage applied to generator 25 by way of line 24 determines the length of the output pulse therefrom. The output waveform from rectangular pulse generator 25 is illustrated in FIGURE 2(e) and is applied to video shaper 29 by way of line 28. The output signal from video shaper 29 is a series of pulses as shown in FIGURE 20(f) in which "r" represents the reconstructed trigger pulses, "r," the pulses marking the trailing edge of the rectangular output pulse from rectangular pulse generator 25, and "t," the target period. The trigger pulse from generator 27 is fed to plan position indicator 32, by way of line 31 and is utilized to initiate the radial sweep for the screen of the plan position indicator. The reconstructed video pulses are fed to the signal input of plan position indicator 32 by way of line 30 and the signals representative of received radar targets are displayed upon the face thereof in accordance with their range. It is to be noted that the azimuthal information relating to the received target information has not been hereinbefore presented. However, in the following detailed description of the multi-channel system of the present invention, the means for transmitting and receiving azimuthal information is described.

The multi-channel system is utilized as only one target can be detected per channel per azimuth. Normally five to ten channels would be employed, each channel requiring 200 cycles bandwidth. In the multiple channel system, each channel is utilized for targets between preselected range increments, as determined by the usual range mark generators. As an example, the sawtooth of one channel can be initiated by a 20-mile range mark and cut off by a radar target signal, or if not by the radar target signal, by the 30-mile range marker. The range increment for each channel can be selected by a switching system or any other method determined by the application or predicted target density. To complete the system, an additional narrow band channel is provided for relaying the azimuth position.

Figure 3:
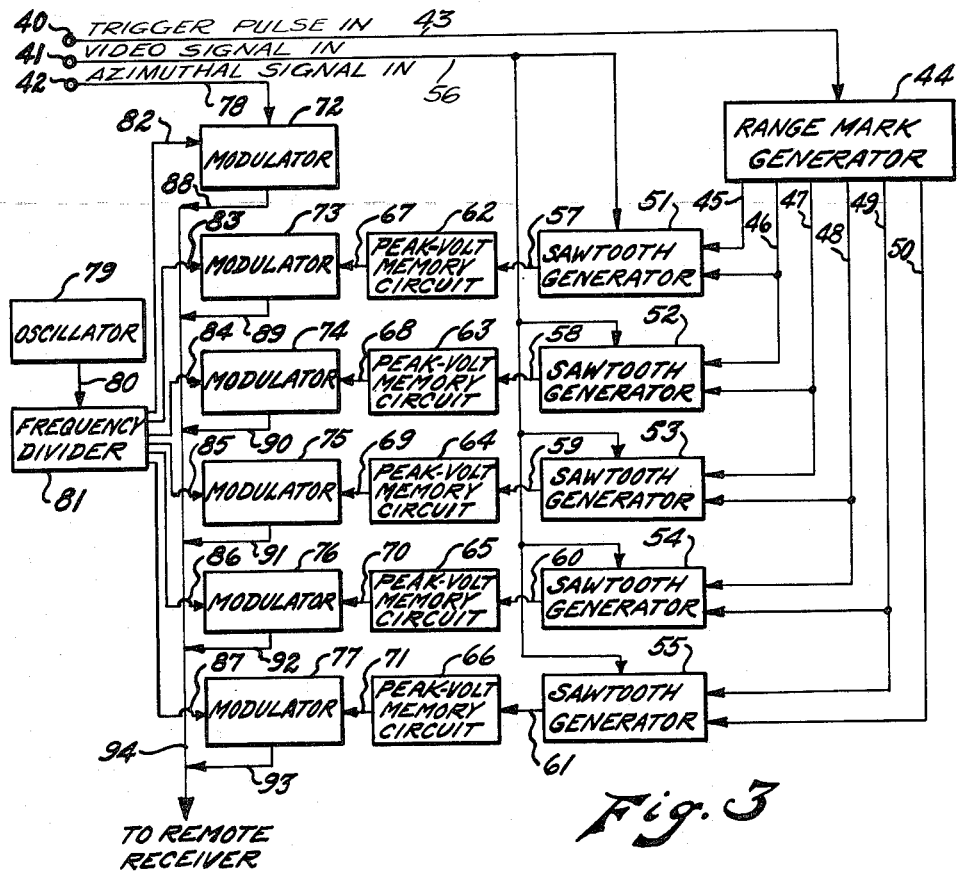
FIGURE 3 is a diagram of the transmitter portion of a preferred embodiment of my invention which includes multiple channel operation.

Now referring in detail to FIGURE 3, which shows the transmitter portion of the multi-channel system, there is shown a five-channel system. Input terminal 40 receives trigger pulses from its associated radar system, the trigger pulses are representative of the main transmitter pulses. The trigger pulses have the identical pulse repetition frequency of the main transmitter pulses. The trigger pulses are applied to range mark generator 44 by way of line 43. Each trigger pulse actuates range mark generator 44 so that the output signals therefrom are range mark pulses representative of 0, 10, 20, 30, 40 and 50 miles, and these pulses appear on lines 45-50, respectively. A range mark generator of this character is conventional and is shown and described on pages 106-110, volume 20 of Radiation Laboratory Series, published by McGraw-Hill Company, Inc. in 1949.

Line 45 feeds the 0-mile range pulse to sawtooth generator 51 and the pulse is utilized to start the generation of a sawtooth waveform. Line 46 feeds the 10-mile range pulse to sawtooth generator 51 which shuts off the aforesaid sawtooth waveform. However, the sawtooth waveform may also be shut off at any interval of time between 0 and 10-mile range by the video trigger pulse applied to sawtooth generator 51 by way of line 56. Line 56 receives video trigger pulses from input terminal 41. The video trigger pulses are supplied by the aforementioned associated radar system and are the radar return video target signals supplied by way of the associated radar receiver.

Figure 5:
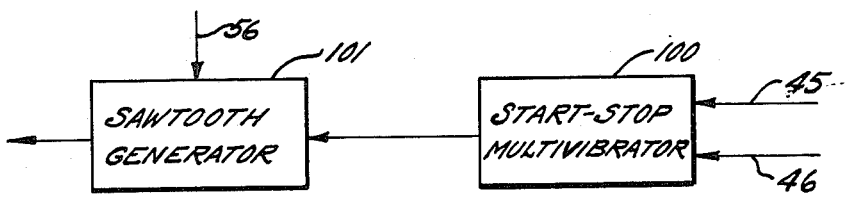
FIGURE 5 is the diagram of the sawtooth generators shown in FIGURE 3.
Figure 2:
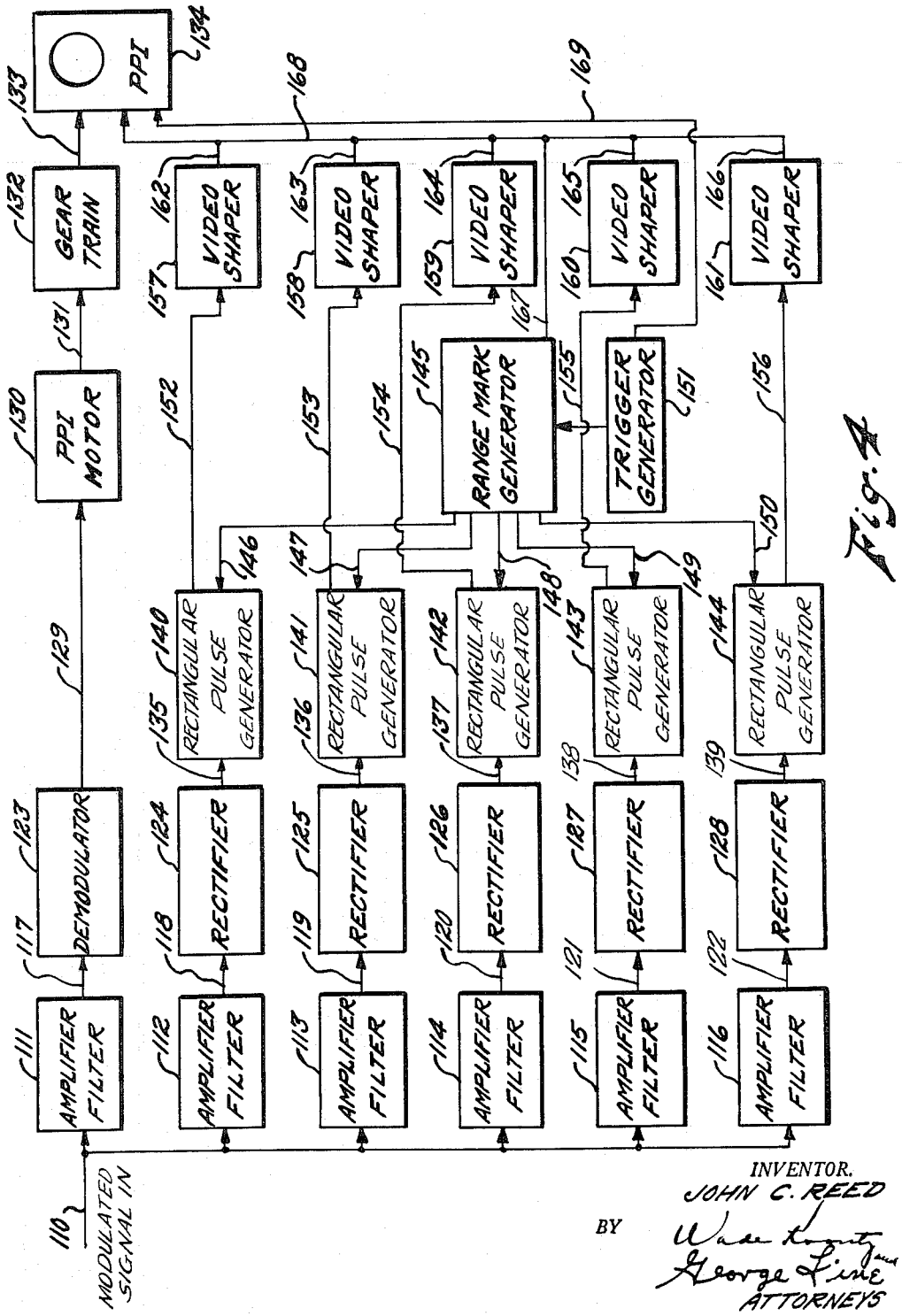

Referring now to FIGURE 5, there is shown in greater detail the sawtooth generator 51 of FIGURE 3. It is to be noted that the description of generator 51 is equally valid as to the sawtooth generators 52-55 as they are identical. Sawtooth generator 51 is comprised of stop-start multivibrator 100 which receives 0-mile range pulse from line 45. The 0-mile range pulse switches on the multivibrator and then the 10-mile range pulse from line 46 switches it off. The output squarewave signal from multivibrator 100 is fed to sawtooth generator 101 which generates a sawtooth waveform whose length is equal to that of the actuating squarewave signal. However, the sawtooth waveform may be switched off whenever a video pulse is received by way of line 56.

Now referring again to FIGURE 3, sawtooth generator 51 provides an output voltage in the form of a sawtooth waveform whose amplitude is determined by either the 10-mile range pulse or by the received video pulse. Similarly, sawtooth generators 52-55 have their output signal amplitudes determined either by 20, 30, 40 or 50 mile range pulses, respectively, or the received video pulses. The output sawtooth waveforms are fed to peak-voltmeter memory circuits 62-66 by way of lines 57-61, respectively. The peak-voltmeter memory circuits measure the peak amplitude of their received signals and retain the measured peak amplitude at their respective outputs until the peak value of the received signals varies. Therefore, the output of each of peak-voltmeter memory circuits 62-66, respectively, provides a direct-current voltage that is proportional to the time difference between the "on" and "off" pulse or the range increments. The "off" pulse is either a video signal representative of a radar return signal, or if not a video signal, the range increment "off" mark.

Modulators 73-77 receive a varying direct current voltage from peak-voltmeter memory circuits 62-66 by way of lines 67-71, respectively. Oscillator 79 provides a signal with a frequency of 1,200 cycles per second which is fed to frequency divider 81 by way of line 80. Frequency divider provides audio signals of 200, 400, 600, 800, 1,000 and 1,200 cycles per second to modulators 72-77 by way of lines 82-87, respectively. Each of the modulated output signals of modulators 73-77 appear on lines 89-93, respectively, and each of the waveforms is similar to the one shown in FIGURE 2(c); however, each of the modulated output signals has a different audio frequency. These modulated signals from lines 89-93 are then fed to common output line 94.

Input terminal 42 receives a signal that has a waveform whose amplitude (voltage) level corresponds to the characteristics of the azimuthal attitude of the aforesaid rotating radar antenna. This azimuthal signal is representative of azimuthal information. This signal is the type that is conventional in radar systems having a plan position indicator, and is provided by means of a conventional synchronous generator connected to the associated rotating radar antenna. The azimuthal information signal is applied to modulator 72 by way of line 78. Modulator 72 also receives an audio frequency signal of 200 cycles per second which modulates the aforesaid azimuthal signal. The modulated azimuthal output signal is also fed to common output line 94 by way of line 88. Line 94 may be connected to a telephone line so that the modulated signals may be relayed to a remote receiver.

Now referring in detail to FIGURE 4, there is shown a remote multi-channel receiver. Line 110 receives the above-mentioned transmitted modulated signals by way of telephone lines. Amplifier-filter 111 receives the transmitted modulated signals by way of line 110 and passes only the 200 cycle modulated azimuthal signal to demodulator 123 by way of line 117. The demodulated azimuthal signal by way of line 129 to PPI motor 130 and then by way of line 131 to gear train 132, is then utilized to provide the azimuthal rotation for plan position indicator 134 by way of line 133. The generation of azimuthal signals and their utilization in providing for plan position indication is conventional and is shown and described in chapter V of volume 22 of Radiation Laboratory Series, published by McGraw-Hill Company, Inc. in 1948.

The modulated signals representative of the video radar return signals and range increments are applied to amplifier-filters 112-116 by way of line 110. Amplifier filters 112-116 pass only signals having frequencies 400, 600, 800, 1,000 and 1,200 cycles, respectively. D.C. signals, representative of either the 10-mile range increments or the video radar return target signals within the 10-mile range increments, are applied to rectangular pulse generators 140–144 by way of lines 118–122, rectifiers 124–128, and lines 135–139, respectively. Simultaneously, range mark generator 145 is triggered by pulses from generator 151, and mark generator 145 provides pulses representative of 0, 10, 20, 30 and 40 miles. Trigger generator 151 provides a pulse repetition frequency substantially identical to that established in the transmitter. Range mark generator 145 is similar to range mark generator 44 shown in FIGURE 3. Rectangular pulse generators 140–144 are identical to rectangular pulse generator 25 of FIGURE 1.

The output signal from rectangular pulse generator 140, for example, is a gate or rectangular waveform which is initiated with the range mark associated with its respective channel. The trailing edge of the rectangular waveform represents the video pulse or the range mark associated with the "off" mark of that channel, or a target signal if one exists.

The rectangular output signals from rectangular pulse generators 140–144 are representative of ranges 10, 20, 30, 40 or 50 miles, respectively, or any video radar return target signals within these range increments. The aforementioned rectangular wave signals are applied to video shapers 157–161 by way of lines 152–156 respectively. Video shapers 157–161 are identical and each one operates to provide a pulse representative of the trailing edge of the rectangular wave signal applied thereto. The video shaper may be a differentiator with diode means to pass only the pulse representative of the trailing edge. The output pulse from video shaper 157 is then a pulse representative of the 10-mile range, or a return target within that range. In a similar fashion, video shapers 158–161 produce output pulses representative of the 20, 30, 40 and 50-mile ranges, respectively, or any targets appearing within the aforementioned ranges.

The pulses from video shapers 157–161 are applied to common line 168 by way of lines 162–166, respectively, and common line 168 also receives range mark pulses from range mark generator 145 by way of line 167. Line 168 feeds plan position indicator 134 pulses representative of target signals and also pulses representative of range marks. These pulses are utilized to illuminate the screen of plan position indicator to display the target signals and the range marks. This type of operation as to the illumination of the screen of the PPI is conventional. The initiation of the sweep for the screen of the PPI is provided by way of a trigger pulse provided by way of trigger generator 151 and line 169. Thus, the video time reference has been reestablished, and individual range marks exactly equivalent to the ones in the transmission system has been provided. Also, the repetition rate has been reestablished, although it is not synchronized with the original rate.

Although in accordance with the provisions of the patent statutes, this invention is described as embodied in concrete form and the principle thereof has been described, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A system for relaying radar target signals and the azimuthal position thereof to remote receivers comprising means for generating a sawtooth waveform for each of said radar target signals, said sawtooth waveform being proportional in length to the range of the radar target signal representative thereof, means to convert each of said sawtooth waveforms to a direct current signal having an amplitude equal to the peak amplitude value of the sawtooth waveform representative thereof, means to generate an azimuthal signal representative of the orientation of the radar antenna receiving said radar target signals, means to modulate said azimuthal signal and said direct current signals at separate preselected audio frequencies, means to transmit said modulated signals to a remote receiver for reconverting said modulated signals to pulses representative of said radar target signals and to signals representative of said azimuthal positions, and means for displaying said reconverted signals on the screen of a plan position indicator.

2. A narrow-band system for relaying radar target signals to a remote receiver comprising means to generate sawtooth waveforms havinng the same pulse repetition frequency as the associated radar providing said radar target signals, each of said sawtooth waveforms being proportional in length to the range of each of said radar target signal, means to convert the peak value of each of said sawtooth waveforms to a direct current signal, means to modulate said direct current signals at an audio frequency, means to transmit said modulated signal to said remote receiver, means to rectify said modulated signals, means at said receiver to generate rectangular pulses at said pulse repetition frequency, each of said generated rectangular pulses having a width determined by said rectified signal, means to convert each trailing edge of each of said rectangular pulses to a pulse representative of said radar target signals, and means to display said pulses representative of said radar target signals on the screen of a plan position indicator.

3. A narrow-band system for relaying radar target signals as defined in claim 2 also including means to generate azimuthal signals representative of the orientation of the radar antenna receiving said radar target signals, means to modulate said azimuthal signals at an audio frequency, means to transmit said azimuthal modulated signals to said remote receiver, means at said receiver to demodulate said azimuthal modulated signals, and means to apply said demodulated signal to said plan position indicator.

4. A system for relaying radar target signals and the associated azimuthal signals to a remote receiver comprising means to generate range mark signals in preselected increments, each incremental range mark signal having a separate channel, means to generate a sawtooth waveform for each of said range mark signals, in each of said channels, means to control the length of said sawtooth waveforms in each of said channels in accordance with the range of said radar target signals or said range mark signals, means in each of said channels to convert the peak value of each of said sawtooth waveforms to a direct current signal, means to modulate said direct current signals in each of said channels at a separate preselected audio frequency, means to audio modulate said azimuthal signals, and means to transmit said modulated signals to a remote receiver, means located at said remote receiver to demodulate said azimuthal signals, means to apply said demodulated signal to a plan position indicator located at said remote receiver, means at said remote receiver to separate each of said modulated signals resulting from said modulation of said direct current signals, means to rectify each of said separated signals, means to generate a rectangular pulse at the pulse repetition frequency of the associated radar providing said radar target signals, means to control the length of said rectangular pulses in accordance with each of said separately rectified signals, means to convert the trailing edge of said rectangular pulses to signals representative of said radar target signals or said generated range marks, and means to display said representative signals of said radar target signals on the screen of said plan position indicator.

References Cited in the file of this patent

UNITED STATES PATENTS

| | | |
|---|---|---|
| 2,519,935 | Smith et al. | Aug. 22, 1950 |
| 2,626,390 | Duke | Jan. 20, 1953 |
| 2,915,746 | Prins | Dec. 1, 1959 |

FOREIGN PATENTS

| | | |
|---|---|---|
| 807,738 | Great Britain | Jan. 21, 1959 |